United States Patent
Hu

(10) Patent No.: US 9,832,439 B2
(45) Date of Patent: Nov. 28, 2017

(54) DEVICE FOR DETERMINING PRINCIPAL FACIAL IMAGE IN PHOTOGRAPHIC IMAGE, AND METHOD AND PROGRAM FOR CONTROLLING SAME

(71) Applicant: FUJIFILM Corporation, Tokyo (JP)

(72) Inventor: Xuebin Hu, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 14 days.

(21) Appl. No.: 15/073,117

(22) Filed: Mar. 17, 2016

(65) Prior Publication Data
US 2016/0203366 A1    Jul. 14, 2016

Related U.S. Application Data

(63) Continuation of application No. PCT/JP2014/067736, filed on Jul. 3, 2014.

(30) Foreign Application Priority Data

Sep. 26, 2013 (JP) .................................. 2013-199212

(51) Int. Cl.
*G06K 9/00* (2006.01)
*H04N 9/79* (2006.01)

(52) U.S. Cl.
CPC .......... *H04N 9/79* (2013.01); *G06K 9/00221* (2013.01); *G06K 9/00315* (2013.01); *G06K 9/00677* (2013.01)

(58) Field of Classification Search
CPC .......... G06K 9/00221; G06K 9/00315; G06K 9/00677; G06K 9/00288; G06K 2009/00738; H04N 9/79
See application file for complete search history.

(56) References Cited

U.S. PATENT DOCUMENTS 8,199,979 B2 * 6/2012 Steinberg .......... G06F 17/30247
                                                      340/5.53
8,379,939 B1    2/2013 Bourdev et al.
(Continued)

FOREIGN PATENT DOCUMENTS

CN    102687146 A    9/2012
JP    2001-167110 A   6/2001
(Continued)

OTHER PUBLICATIONS

An Office Action "Notification of Reasons for Refusal" issued by the Japanese Patent Office dated Jun. 21, 2016, which corresponds to Japanese Patent Application No. 2013-199212 and is related to U.S. Appl. No. 15/073,117; with English language translation.
The extended European search report issued by the European Patent Office dated Oct. 13, 2016, which corresponds to European Patent Application No. 14848154.2-1901 and is related to U.S. Appl. No. 15/073,117.

(Continued)

*Primary Examiner* — Ali Bayat
(74) *Attorney, Agent, or Firm* — Studebaker & Brackett PC

(57) ABSTRACT

Disclosed are a device for determining a principal facial image in a captured image capable of determining a person participating in a specific event as a principal person among multiple captured images, a control method and a control program therefor, and a recording medium storing the control program. Multiple captured image P1 and the like are grouped by event, and a captured image group G1 and the like are obtained. Face detection is performed on the captured images for each of the captured image group G1 and the like, a facial image F1 and the like are obtained, and a plurality of facial image group FG1 and the like are obtained. In each of the facial image group FG1 and the like, a principal facial image RF1 and the like are obtained. A facial image of a person who participates only in a specific event can be determined as a principal facial image, and an (Continued)

electronic album where the person of the principal facial image is a main character can be generated.

17 Claims, 12 Drawing Sheets

(56) References Cited

U.S. PATENT DOCUMENTS

| | | | |
|---|---|---|---|
| 9,058,342 B2 * | 6/2015 | Yamaguchi | G06F 17/30247 |
| 9,171,013 B2 * | 10/2015 | Gokturk | G06F 17/30253 |
| 9,311,530 B1 * | 4/2016 | Murphy-Chutorian | G06K 9/00221 |
| 9,389,768 B2 * | 7/2016 | Nonaka | G06F 3/017 |
| 9,430,719 B2 * | 8/2016 | Gokturk | G06F 17/30253 |
| 2010/0156834 A1 | 6/2010 | Sangster | |
| 2011/0099199 A1 | 4/2011 | Stalenhoef et al. | |
| 2011/0110564 A1 | 5/2011 | Tabe | |

FOREIGN PATENT DOCUMENTS

| | | |
|---|---|---|
| JP | 2006-079461 A | 3/2006 |
| JP | 2007-060563 A | 3/2007 |
| JP | 2007-199923 A | 8/2007 |
| JP | 2007-249588 A | 9/2007 |
| JP | 2009-182876 A | 8/2009 |
| JP | 2009-201041 A | 9/2009 |
| JP | 2010-093865 A | 4/2010 |
| JP | 2011-101251 A | 5/2011 |
| JP | 2012-075020 A | 4/2012 |
| JP | 2012-114559 A | 6/2012 |
| JP | 2013-171373 A | 9/2013 |

OTHER PUBLICATIONS

Tong Zhang et al.; "Face Based image Navigation and Search"; Proceedings of the 17th ACM international conference on Multimedia 2009; MM '09; Oct. 19-24, 2009; pp. 597-600; Beijing, China.

Pere Obrador et al.; "Supporting Personal Photo Storytelling for Social Albums"; Proceedings of the 18th ACM international conference on Multimedia 2010 MM '10; Oct. 25-29, 2010; pp. 561-570; Firenze, Italy.

International Search Report—PCT/JP2014/067736 dated Aug. 5, 2014.

Written Opinion—PCT/JP2014/067736 dated Aug. 5, 2014.

International Preliminary Report on Patentability of the International Preliminary Examining Authority; PCT/JP2014/067736 dated Nov. 26, 2014.

The First Office Action issued by the Chinese Patent Office dated Jun. 2, 2017, which corresponds to Chinese Patent Application No. 201480049922.X and is related to U.S. Appl. No. 15/073,117; with English language translation.

Communication pursuant to Article 94(3) EPC issued by the European Patent Office dated Jul. 20, 2017, which corresponds to European Patent Application No. 14 848 154.2-1901 and is related to U.S. Appl. No. 15/073,117.

Sasage et al.; "Analisis of Human Relationship from Photos and Community Based Photo Search"; IPSJ SIG Technical Report; Dec. 12, 2012; pp. 1-7; vol. 2012-DBS-156 No. 9.

An Office Action; "Notification of Reasons for Refusal", issued by the Japanese Patent Office dated Aug. 1, 2017, which corresponds to Japanese Patent Application No. 2016-191406 and is related to U.S. Appl. No. 15/073,117; with English language translation.

* cited by examiner

FIG. 6

| PRINCIPAL FACIAL IMAGE | CAPTURED IMAGE IN WHICH PERSON OF PRINCIPAL FACIAL IMAGE IS INCLUDED |
|---|---|
| RF1 | P1,P2,P4,P6,P8,P9,P12,P13 ⋯⋯ |
| RF2 | P3,P5,P6,P11,P12,P13,P15 ⋯⋯ |
| RF3 | P2,P4,P7,P9, ⋯⋯ P21, ⋯⋯ P32,P33 ⋯⋯ |
| RF4 | P11,P13,P21,P31,P32,P33,P34,P35 ⋯⋯ |
| RF5 | P41,P42,P53,P54,P61,P62 |

FIG. 7

| PRINCIPAL FACIAL IMAGE | CAPTURED IMAGE IN WHICH PERSON OF PRINCIPAL FACIAL IMAGE IS INCLUDED |
|---|---|
| RF1 | P1,P2,P4,P6,P7,P8,P9,P12,P13 ⋯⋯ |
| RF2 | P3,P5,P6,P11,P12,P13,P15 ⋯⋯ |
| RF4 | P11,P13,P21,P31,P32,P33,P34,P35 ⋯⋯ |
| RF5 | P41,P42,P53,P54,P61,P62 |

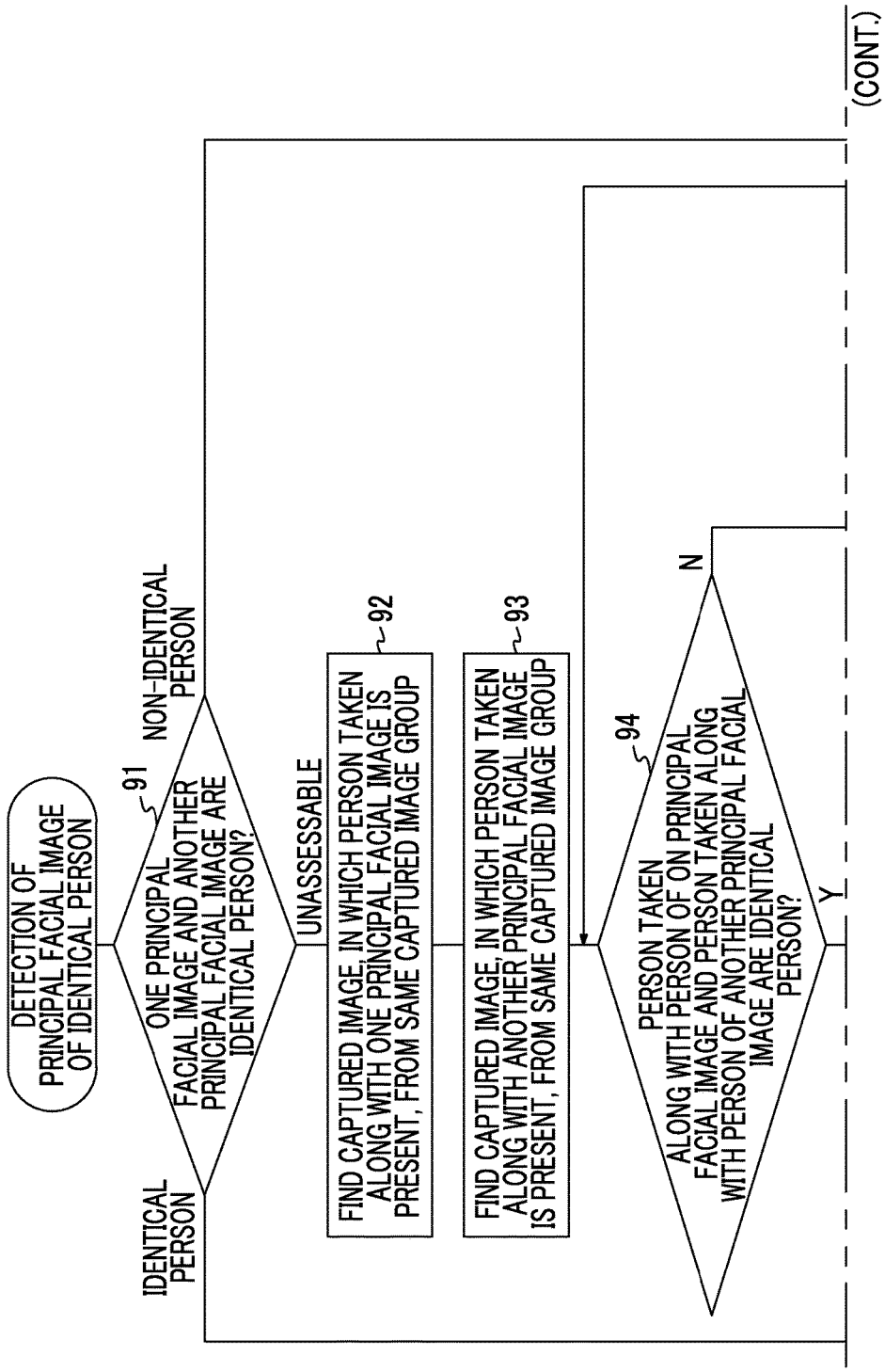

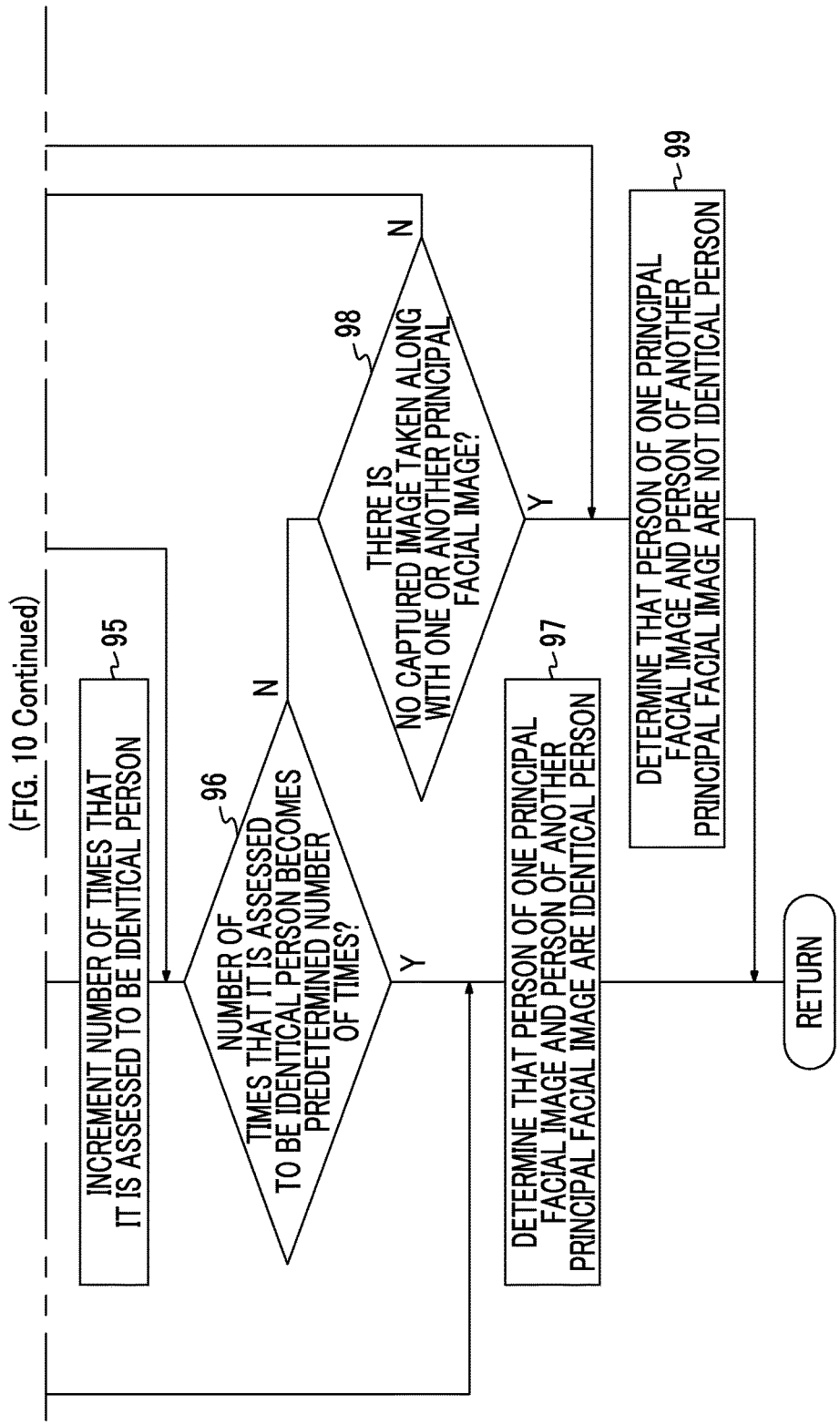

DEVICE FOR DETERMINING PRINCIPAL FACIAL IMAGE IN PHOTOGRAPHIC IMAGE, AND METHOD AND PROGRAM FOR CONTROLLING SAME

CROSS-REFERENCE TO RELATED APPLICATIONS

This application is a Continuation of PCT International Application No. PCT/JP2014/067736 filed on Jul. 3, 2014, which claims priority under 35 U.S.C. §119(a) to Japanese Patent Application No. 2013-199212 filed Sep. 26, 2013. Each of the above application(s) is hereby expressly incorporated by reference, in its entirety, into the present application.

BACKGROUND OF THE INVENTION

1. Field of the Invention

The present invention relates to a device for determining a principal facial image in a captured image, and a control method and a control program therefor.

2. Description of the Related Art

The faces of people other than a principal person is included in a captured image, and there are differences in various face directions, face expressions, and environments, such as illuminations; thus, it is not easy to determine the principal person simply through face recognition. It is difficult to stably determine the principal person.

In a case where an electronic album is generated from multiple captured images, since a person included in a captured image is not known, a user specifies a person (U.S. Pat. No. 8,379,939B). An electronic album where a specific person is mostly included is created. In a case where captured images for use in the electronic album are automatically extracted from the multiple captured images, since a person who is taken in many captured images is considered as a principal person, the electronic album is generated such that many captured images of this person are included.

SUMMARY OF THE INVENTION

However, if a person taken in multiple captured images is determined as a principal person, it is not possible to determine, as a principal person, a person who is often imaged in a certain event.

An object of the invention is to determine, as a principal person, a person who is often imaged in a certain event.

The invention provides a device for determining a principal facial image in a captured image including a facial image grouping device for grouping multiple facial images obtained from multiple captured images by event to generate a plurality of facial image groups, and a principal facial image determination device for determining one or a plurality of principal facial images of facial images included in each of the plurality of facial image groups generated by the facial image grouping device as a facial image of a principal person of the multiple captured images for each facial image group.

The invention also provides a control method for a device for determining a principal facial image in a captured image. That is, the method includes causing a facial image grouping device to group multiple facial images obtained from multiple captured images by event to generate a plurality of facial image groups, and causing a principal facial image determination device to determine one or a plurality of principal facial images of facial images included in each of the plurality of facial image groups generated by the facial image grouping device as a facial image of a principal person of the multiple captured images for each facial image group.

The invention also provides a program which controls a computer of a device for determining a principal facial image in a captured image, and a recording medium storing the program.

The device may further include a facial image group mixing device for assembling facial image groups, in which the number of facial images included in each of the plurality of facial image groups generated by the facial image grouping device is less than a given number, in one facial image group. In this case, the principal facial image determination device may determine the facial image group assembled in the facial image group mixing device and a principal facial image of facial images included in each of the plurality of facial image groups generated by the facial image grouping device for each facial image group.

For example, the facial image group mixing means may assemble facial image groups, in which the number of facial images included in each of the plurality of facial image groups generated by the facial image grouping means is less than the given number, in one facial image group such that a given number or more of facial images are included.

The device may further include a first principal facial image assessment device for assessing whether or not one principal facial image and another principal facial image among the principal facial images determined for each facial image group by the principal facial image determination device represent an identical person.

It is preferable that the device further includes a second principal facial image assessment device for assessing whether one principal facial image and another principal facial image among the principal facial images determined for each facial image group by the principal facial image determination device represent an identical person or a non-identical person, and an auxiliary facial image assessment device for, in a case where the second principal facial image assessment device is unable to assess whether one principal facial image and another principal facial image represent an identical person or a non-identical person, assessing whether or not a facial image included in a captured image with one principal facial image and a facial image included in a captured image with another principal facial image are an identical person. In this case, the second principal facial image assessment device may assess that one principal facial image and another principal facial image represent an identical person when the auxiliary facial image assessment device assesses that the facial image included in the captured image with one principal facial image and the facial image included in the captured image with another principal facial image are an identical person.

For example, the second principal facial image assessment device may assesses that one principal facial image and another principal facial image represent an identical person when the number of times that the auxiliary facial image assessment device assesses that the facial image included in the captured image with one principal facial image and the facial image included in the captured image with another principal facial image are an identical person is equal to or greater than a predetermined number.

The facial image grouping device may include a captured image grouping device for grouping the multiple captured images by event. In this case, for example, facial images may be detected from the multiple captured images grouped by event by the captured image grouping device to generate a plurality of facial image groups by event.

The facial image grouping device may further include a facial image detection device for detecting a facial image from each of the multiple captured images. In this case, the multiple facial images detected by the facial image detection device may be grouped by event to generate a plurality of facial image groups.

It may be defined that captured images whose imaging timing is close are obtained in the same event and captured images whose imaging timing is different are obtained in different events, and multiple captured images may be grouped by event.

The device may further include a term adjustment device for adjusting a term during which the imaging timing is different to be considered as different events.

The device may further include an electronic album generation device for generating an electronic album where captured images including at least one principal person among principal persons specified by the principal facial images determined by the principal facial image determination device are more than other captured images.

The device may further include a display control device for performing control such that a display device displays the principal facial images determined by the principal facial image determination device on a display screen, and a principal facial image designation device for designating at least one principal facial image among the principal facial images displayed on the display screen of the display device under the control of the display control device. In this case, the electronic album generation device may generate the electronic album using the multiple captured images such that captured images including the principal person specified by one principal facial image designated by the principal facial image designation device are more than captured images not including the principal person.

For example, the display control device may perform control such that the display device displays one principal facial image on the display screen for the principal facial images determined as representing an identical person by the second principal facial image assessment device among the principal facial image determined by the principal facial image determination device.

According to the invention, the multiple facial images obtained from the multiple captured images are grouped by event and a plurality of facial image groups are generated. One or a plurality of principal facial images of the facial images included in each of a plurality of generated facial image groups are determined as a facial image of a principal person of the multiple captured images for each facial image group. Since the principal facial image (principal person) by event is determined from the captured images obtained by event, it is possible to determine a person who participates in a specific event as a principal person among the multiple captured images.

BRIEF DESCRIPTION OF THE DRAWINGS

FIG. 6 shows the relationship between a principal facial image and a captured image including the person of the principal facial image.

FIG. 7 shows the relationship between a principal facial image and a captured image including the person of the principal facial image.

FIG. 10 is a flowchart showing a principal facial image detection processing procedure of an identical person.

DESCRIPTION OF THE PREFERRED EMBODIMENTS

Figure 1:
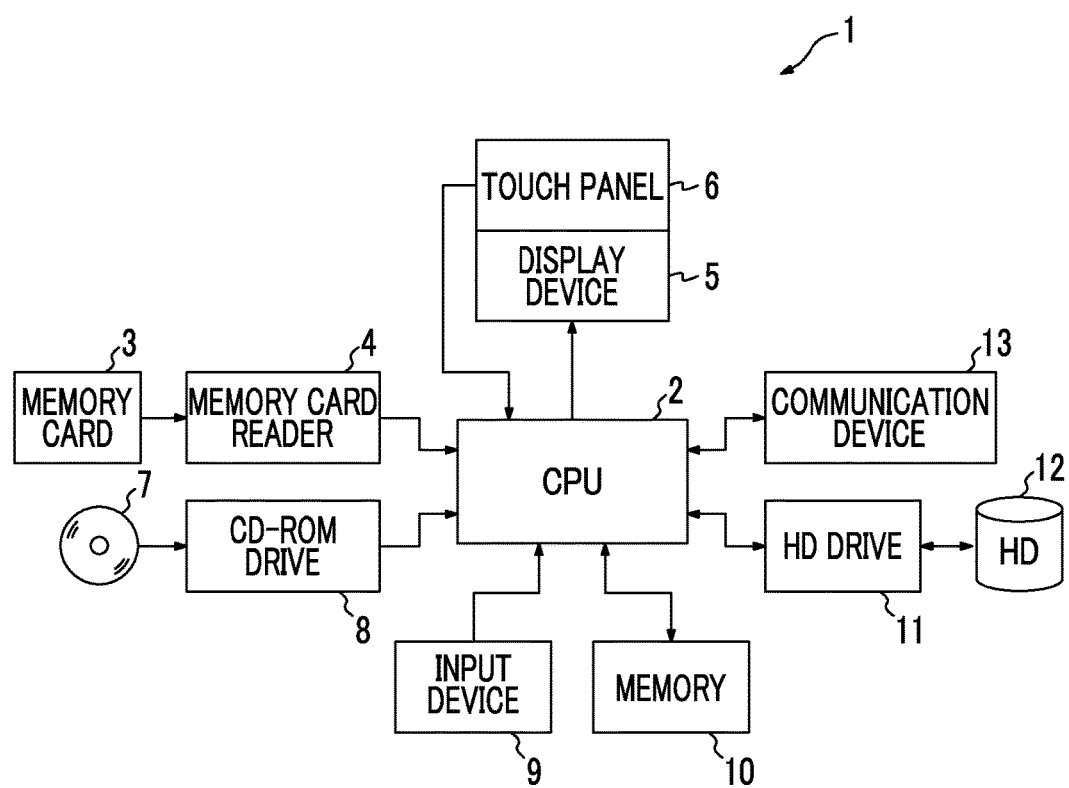
FIG. 1 is a block diagram showing the electrical configuration of an electronic album generation device.

FIG. 1 is a block diagram showing the electrical configuration of an electronic album generation device 1.

The overall operation of the electronic album generation device 1 (a principal facial image determination device of a captured image) is controlled by a CPU 2.

The electronic album generation device 1 is provided with a display device 5. On a display screen of the display device 5, a touch panel 6 which allows a user to give a command to the electronic album generation device 1 is formed. The electronic album generation device 1 is also provided with a memory card reader 4. A memory card 3, in which image files representing multiple captured images are stored, are loaded in the memory card reader 4, and the image files are read by the memory card reader 4.

The electronic album generation device 1 also includes a compact disk-read only memory (CD-ROM) drive 8. A compact disk 7, in which an operation control program described below is stored, is loaded in the CD-ROM drive 8, and the program is read. The read program is written to a hard disk 12 by a hard disk drive 11. The electronic album generation device 1 also includes a communication device 13. The operation control program described below may be downloaded from the communication device 13.

The electronic album generation device 1 also includes an input device, such as a keyboard, and a memory 10.

Although the electronic album generation device 1 is provided at a storefront of a supermarket or a convenience store, the operation control program can be installed on a personal computer of the user, and the personal computer can be used as the electronic album generation device 1.

Figure 2:
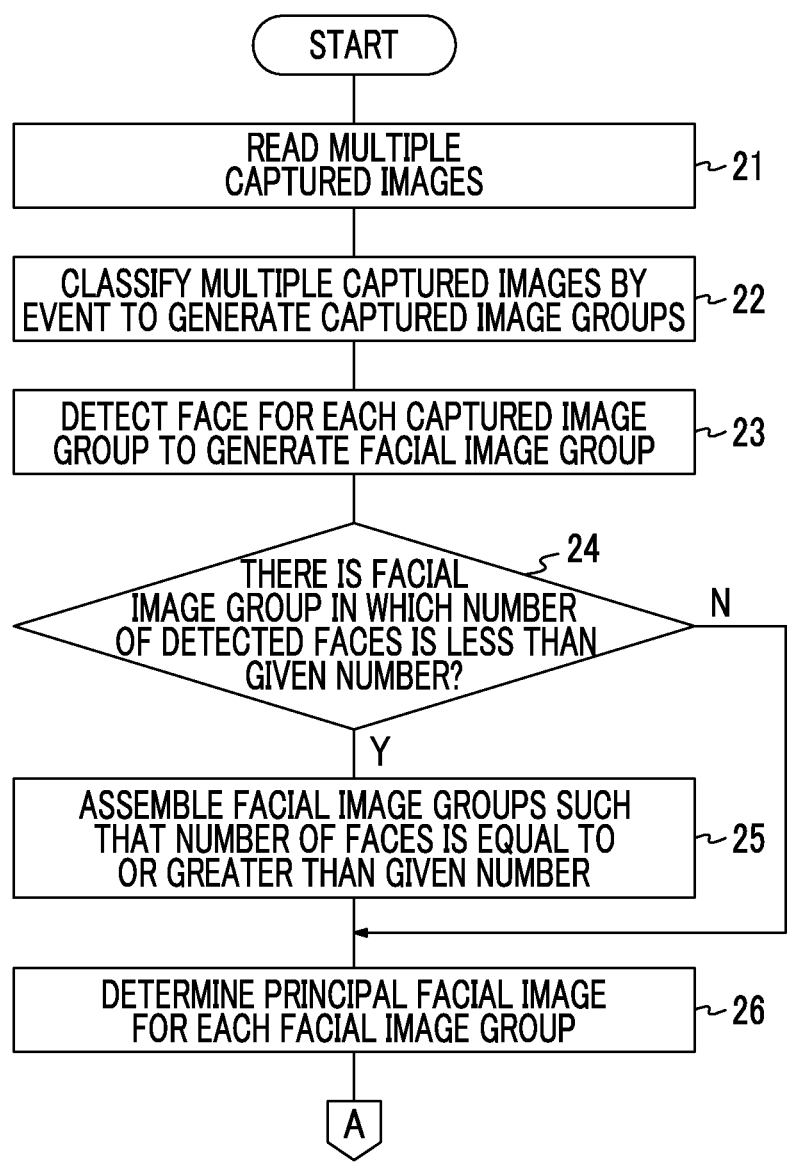
FIG. 2 is a flowchart showing a processing procedure of the electronic album generation device.
Figure 3:
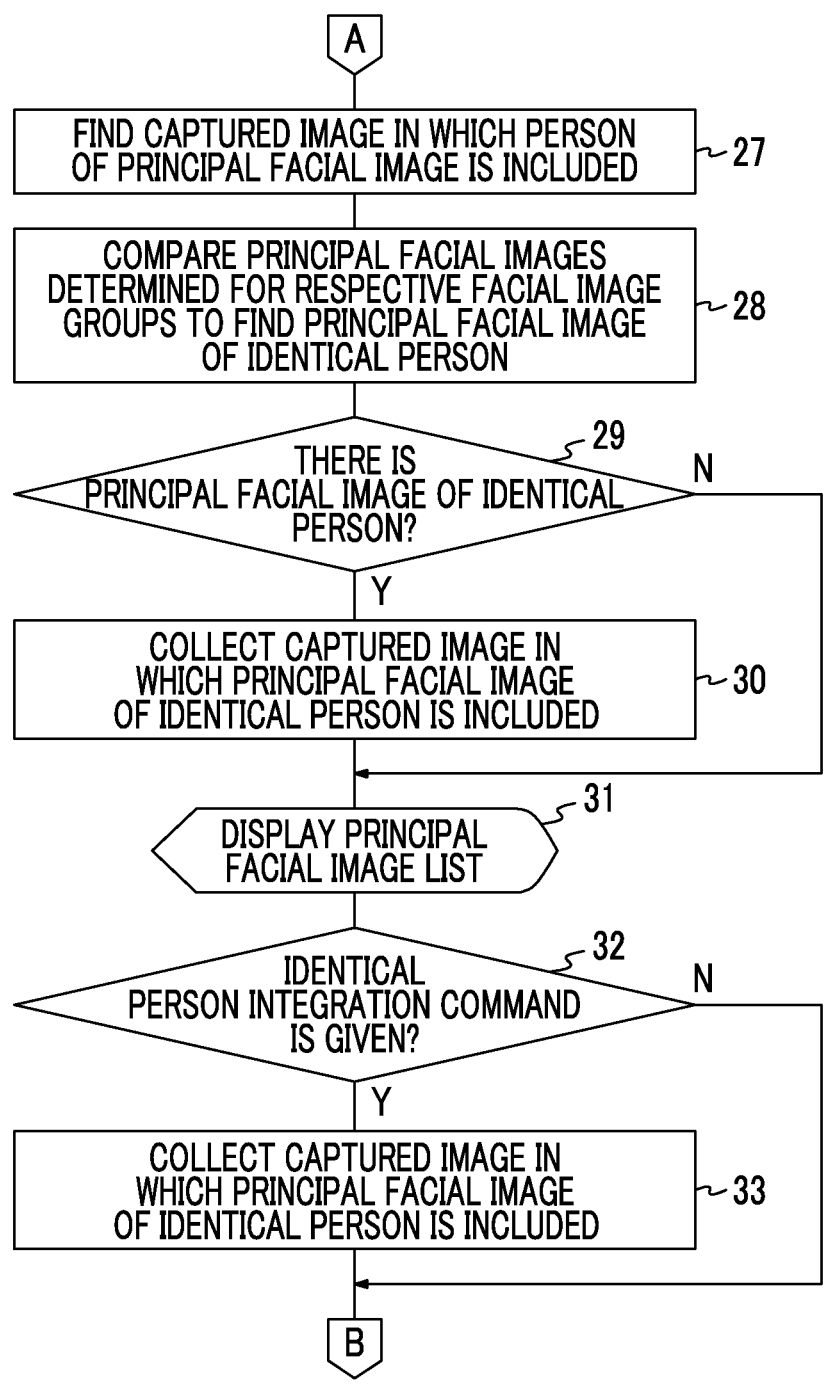
FIG. 3 is a flowchart showing a processing procedure of the electronic album generation device.
Figure 4:
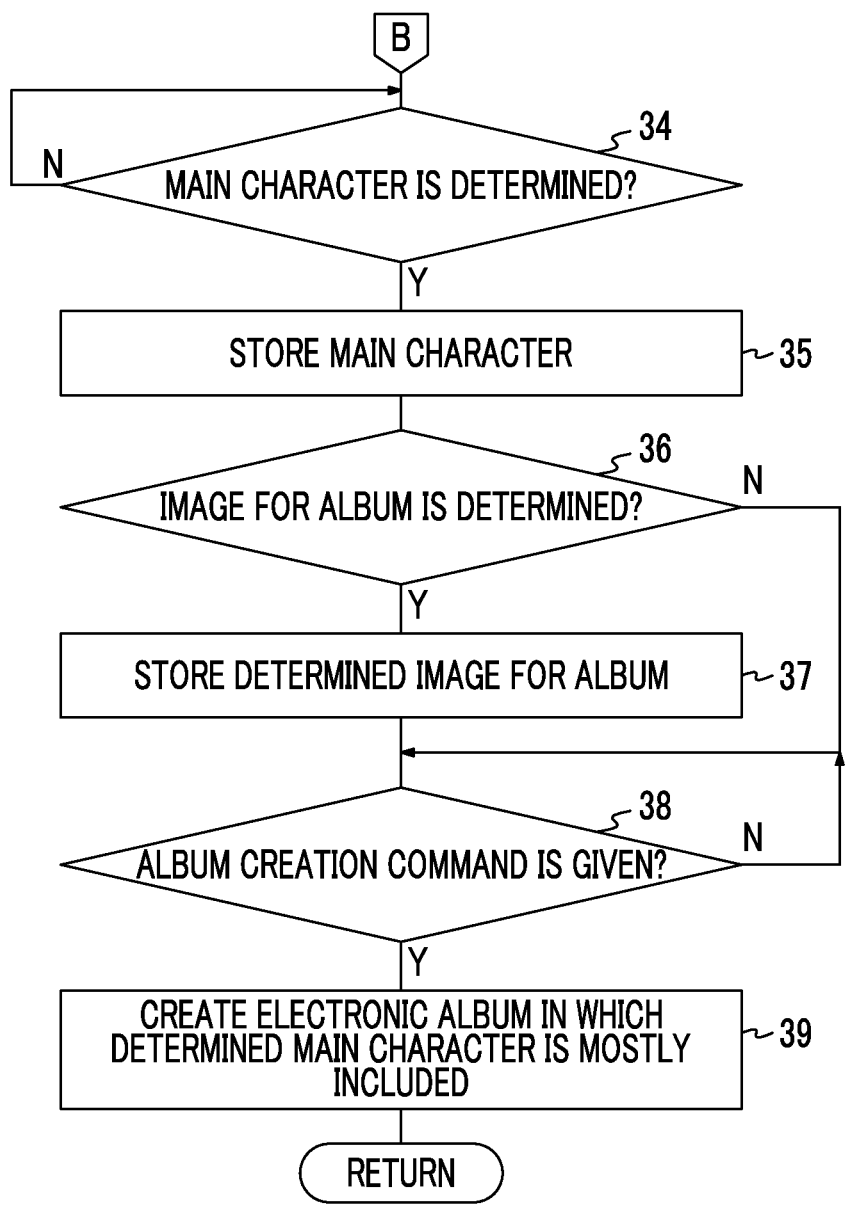
FIG. 4 is a flowchart showing a processing procedure of the electronic album generation device.

FIGS. 2 to 4 are flowcharts showing a processing procedure for generating an electronic album in the electronic album generation device 1.

The memory card 3, in which the image files representing the multiple captured images are stored, is loaded in the memory card reader 4 by the user. Then, the image files stored in the memory card 3 are read by the memory card reader 4 (Step 21 of FIG. 2). The read image files are temporarily stored in the memory 10 by the CPU 2.

The multiple captured images represented by the read image files are classified by event in the CPU 2, and a plurality of captured image groups are generated (Step 22 of FIG. 2) (captured image grouping means).

Figure 5:
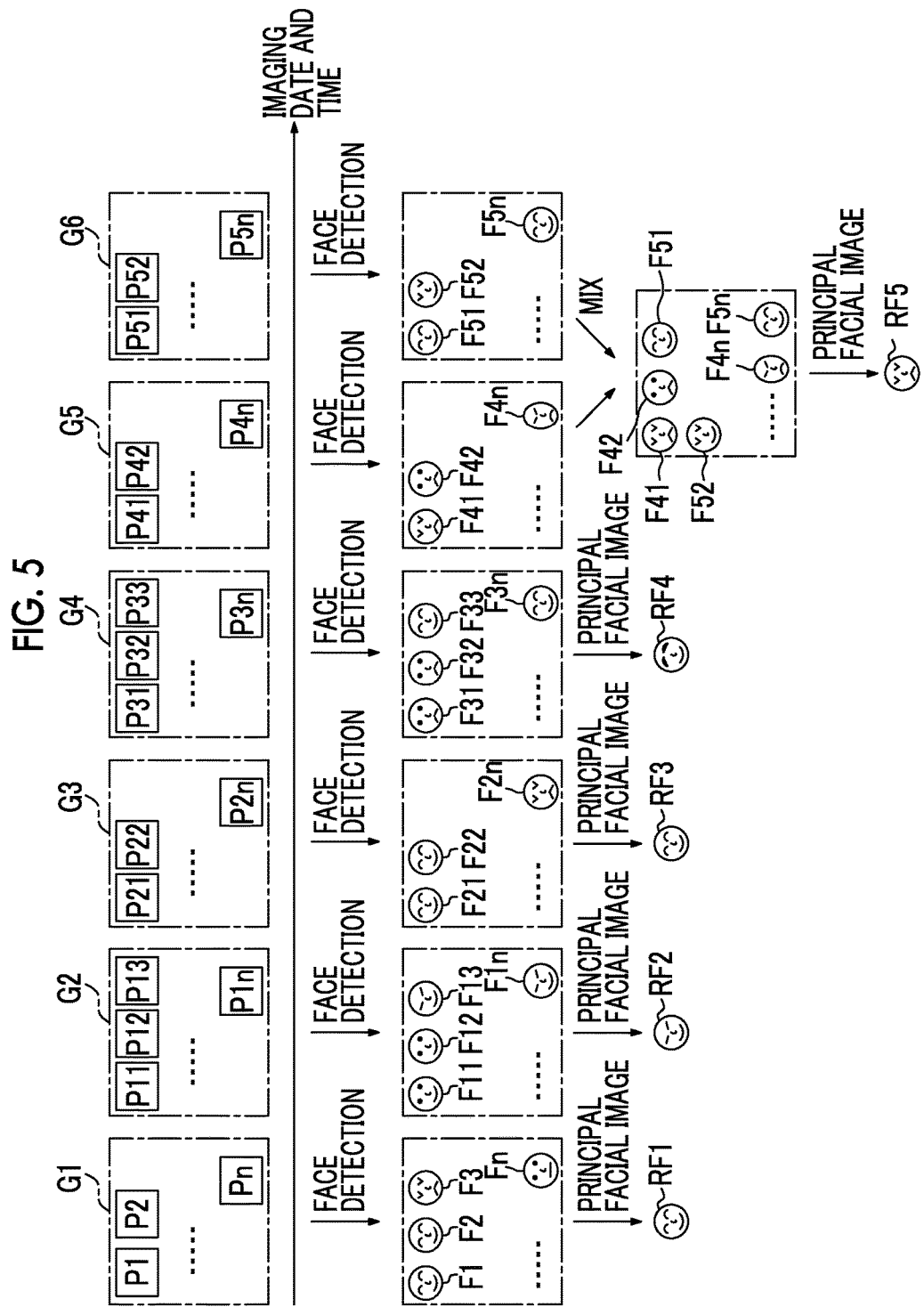
FIG. 5 shows a manner in which a principal facial image is obtained.

Referring to FIG. 5, multiple captured image P1 and the like are arranged in a time-series order. The time elapses from left to right in FIG. 5. In an event, such as an entrance ceremony or an athletic meeting, many images are captured on the day of the entrance ceremony or the athletic meeting. The number of captured images on a day with no event is small. For this reason, if the multiple captured image P1 and the like are arranged in a time-series order, a mass of captured images can be obtained. In this way, a mass of captured images whose imaging timing is close is considered as captured images obtained in the same event, and becomes one captured image group corresponding to one event. Captured images whose imaging timing is different are considered as captured images obtained in different events, and multiple captured images are grouped by event. In the example shown in FIG. 5, multiple images are classified into captured image groups G1 to G6. Captured images P1 to Pn are included in the captured image group G1, captured images P11 to P1$n$ are included in the captured image group G2, captured images P21 to P2$n$ are included in the captured image group G3, captured images P31 to P3$n$ are included in the captured image group G4, captured images P41 to P4$n$ are included in the captured image group G5, and captured images P51 to P5$n$ are included in the captured image G6.

If the captured image groups are generated, face detection is performed by the CPU 2 from the captured images included in the captured image group for each captured image group, and facial image groups are generated by the CPU 2 (Step 23 of FIG. 2) (facial image grouping means).

Referring to FIG. 5, face detection is performed on the captured image P1 and the like included in the captured image group G1, facial images F1 to Fn are obtained, and a facial image group FG1 is generated. Face detection is performed on the captured image P11 and the like included in the captured image group G2, facial images F11 to F1$n$ are obtained, and a facial image group FG2 is generated. Face detection is performed on the captured image P21 and the like included in the captured image group G3, facial images F21 to F2$n$ are obtained, and a facial image group FG3 is generated. Face detection is performed on the captured image P31 and the like included in the captured image group G4, facial images F31 to F3$n$ are obtained, and a facial image group FG3 is generated. Face detection is performed on the captured image P41 and the like included in the captured image group G5, facial images F41 to F4$n$ are obtained, and a facial image group FG5 is generated. Face detection is performed on the captured image PSI and the like included in the captured image group G6, facial images F51 to F5$n$ are obtained, and a facial image group FG6 is generated.

A plurality of captured image group G1 and the like are generated from multiple captured images, and thereafter, a plurality of facial image group FG1 and the like are generated. However, facial images may be detected from multiple captured images, and the detected multiple facial images are divided into facial image groups by event. In this case, the imaging date and time of the captured image is stored in a file representing the detected facial image, and the multiple facial images are divided into the facial image groups by event using the imaging date and time.

In this example, a principal facial image is determined from among the facial images included in each of the generated facial image groups. However, in a case where the number of facial images in the facial image group is small (a case where the number of captured images included in the captured image group is small), the determined principal facial image may not necessarily be an important person so that a user of an electronic album is another user. For this reason, in this example, it is confirmed by the CPU 2 whether or not there are facial image groups in which the number of faces included in each of the facial image groups is less than a given number (Step 24 of FIG. 2), and in a case where there are facial image groups in which the number of faces is less than the given number (in Step 24 of FIG. 2, YES), the facial image groups are assembled by the CPU 2 such that the number of faces included in the facial image group is equal to or greater than the given number (Step 25 of FIG. 2) (facial image group mixing means). The facial image groups are considered to be put together in an ascending order of the number of facial images included therein, but it may not necessarily be so.

Referring to FIG. 5, it is assumed that the number of facial image F41 and the like included in the facial image group FG5 is less than the given number, and the facial image F51 and the like included in the facial image group FG6 is less than the given number. Then, the facial image groups FG5 and FG6 are assembled, and become a new facial image group FG5. In the facial image group FG5, the facial image F51 and the like included in the facial image group FG6 are included, in addition to the facial image F41 and the like included in the facial image group FG5 before assembled. If the number of facial images included in the facial image group FG5 remains less than the given number, the facial image group FG5 is further assembled to another facial image group.

Subsequently, a principal facial image (a facial image of a principal person) is determined by the CPU 2 for each facial image group (Step 26 of FIG. 2) (principal facial image determination means). The principal facial image will be a facial image, the number of which representing a face considered as an identical person among the facial images included in each of the facial image groups is largest. However, a facial image, the number of which representing a face considered as an identical person among facial images equal to or greater than a predetermined size, not simply the number of facial images, is largest, may be determined as a principal facial image. The number of principal facial images may not be one, and may be plural. Referring to FIG. 5, the principal facial images of the facial image groups FG1, FG2, FG3, FG4, and FG5 become RF1, RF2, RF3, RF4, and RF5.

If the principal facial image is determined for each facial image group, the captured images including the person of the principal facial image are found from among the multiple captured images represented by the image files read from the memory card 3 (Step 27 of FIG. 4). The captured images including the person of the principal facial image are found from among the captured images included in other captured image groups as well as the captured image group including the principal facial image. In FIG. 5, the captured images including the person of the principal facial image RF1 are found from the captured images included in other captured image groups G2 to G6 as well as the captured image group G1. The same applies to other principal facial images RF2 to RF5.

FIG. 6 is a table showing captured images including a person of a principal facial image.

A (file name specifying a) captured image including the person of the principal facial image is stored corresponding to the principal facial image determined in the above-described manner. For example, the captured images including the person of the principal facial image RF1 are P1, P2, P4, P6, P8, P9, P12, P13, and the like, and are also found from the captured image groups other than the captured image group G1 in which the principal facial image RF1 is obtained. The same applies to other principal facial images RF2 to RF5.

If the captured images including the person of the principal facial image are found from the multiple captured images, the principal facial images are compared with each other by the CPU 2, and if there are a plurality of principal facial images representing an identical person, the principal facial images are found (Step 28 of FIG. 3) (first principal facial image assessment means). If there are a plurality of principal facial images representing an identical person (in Step 29 of FIG. 3, YES), the captured images including the persons of a plurality of principal facial images are found (Step 30 of FIG. 3). For example, it is assumed that the person represented by the principal facial image RF1 and the person represented by the principal facial image RF3 are an identical person. As described above, the captured images including the person of the principal facial image RF1 are P1, P2, P4, P6, P8, P9, P12, P13, and the like. The captured images including the person of the principal facial image RF3 are P2, P4, P7, . . . , P21, . . . , P32, P33, and the like. The captured images are matched, and the matched captured images become the captured images including the person represented by the principal facial image RF1 (or RF3) (see FIG. 7).

If the person represented by the principal facial image RF1 and the person represented by the principal facial image RF3 are handled as being not an identical person, in a case of creating an electronic album where the person represented by the principal facial image RF1 is a main character using the captured images including the person specified by the principal facial image RF1, the captured images P1, P2, P4, P6, P8, P9, P12, P13, and the like including the person specified by the principal facial image RF1 shown in FIG. 6 are used; thus, the captured images (for example, the captured image P7 and the like) which are not included in the captured images including the person specified by the principal facial image RF1 but include the person specified by the principal facial image RF3 are not used. In this example, in a case where there are principal facial images representing an identical person among a plurality of principal facial images, the captured images including the persons represented by these principal facial images are assembled. For this reason, an electronic album can be created using captured images which represent an identical person, and which are not included in captured images including a person represented by one principal facial image but are included in captured images including a person specified by another principal facial image.

As described above, in a case where the person specified by the principal facial image RF1 and the person specified by the principal facial image RF3 shown in FIG. 6 are an identical person, as shown in FIG. 7, the respective captured images are assembled (the captured image P7 is added to the captured images including the person of the principal facial image RF1).

Subsequently, the principal facial images are displayed on the display screen of the display device 5 in a list (Step 31 of FIG. 3).

Figure 8:
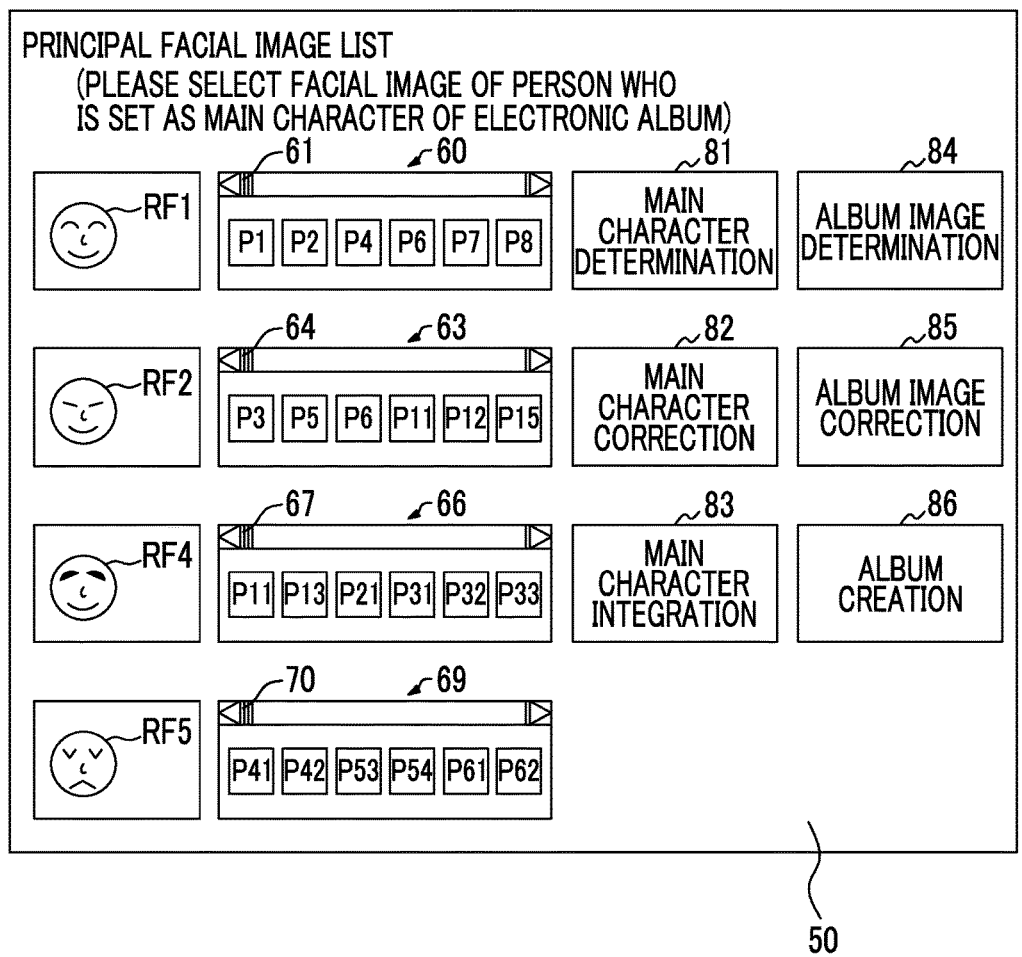
FIG. 8 is an example of a display screen.

FIG. 8 is an example of a principal facial image list image.

On the left side of the display screen of the display device 5, the principal facial images RF1, RF2, RF4, and RF5 obtained in the above-described manner are displayed. On the right side of the principal facial images RF1, RF2, RF4, and RF5, as shown in FIG. 7, captured image display areas 60, 63, 66, and 69 which display the captured images including the person of the principal facial image are displayed. In the upper portions of the captured image display areas 60, 63, 66, and 69, scroll bars 61, 64, 67, and 70 are formed. The scroll bars 61, 64, 67, and 70 are operated right and left, whereby the captured images which are not displayed in the captured image display areas 60, 63, 66, and 69 are displayed in the captured image display areas 60, 63, 66, and 69.

On the right side of the display screen 50, a main character determination button 81 with characters "MAIN CHARACTER DETERMINATION", a main character correction button 82 with characters "MAIN CHARACTER CORRECTION", a main character integration button 83 with characters "MAIN CHARACTER INTEGRATION", an album image determination button 84 with characters "ALBUM IMAGE DETERMINATION", an album image correction button 85 with characters "ALBUM IMAGE CORRECTION", and an album creation button 86 with characters "ALBUM CREATION" are displayed.

Figure 9:
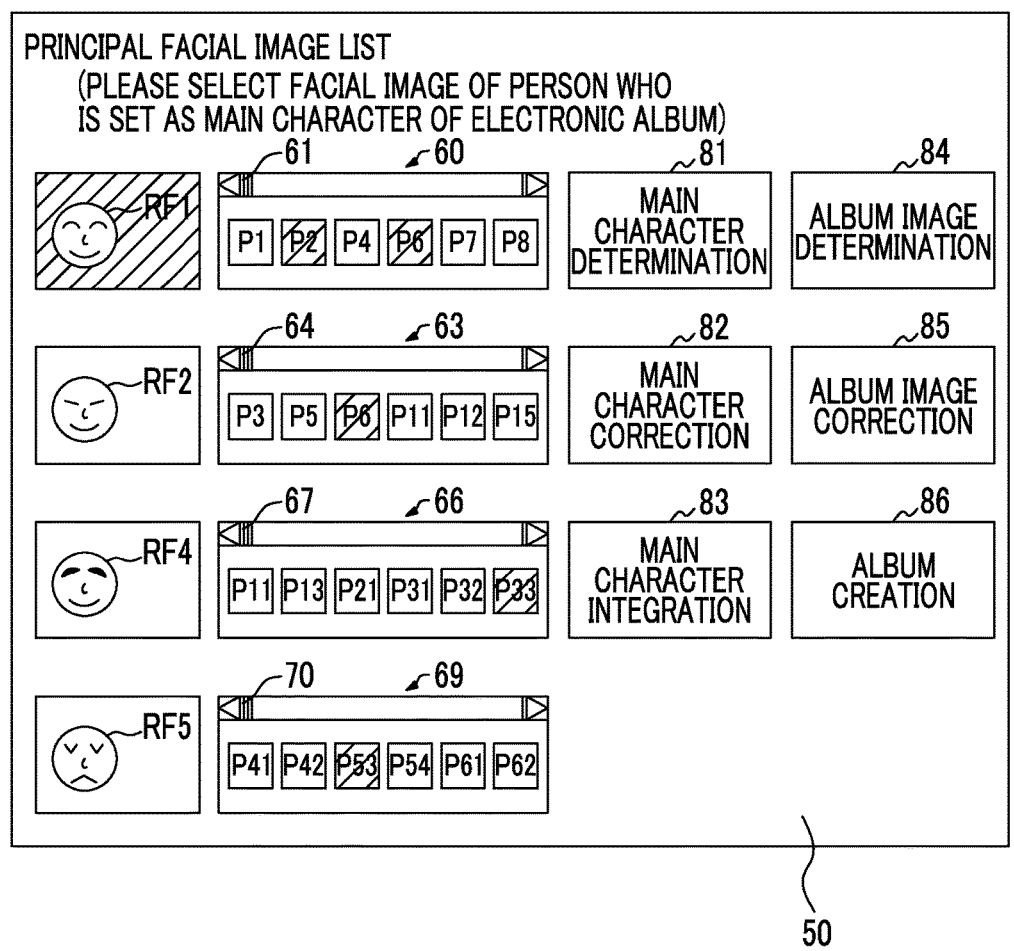
FIG. 9 is an example of the display screen.

The main character determination button 81 is touched by the user in a case of determining a principal object to be a main character of an electronic album from among the principal facial images displayed on the display screen 50. In a case of determining the person of the principal facial image RF1 as a main character, the principal facial image RF1 is touched (the touched principal facial image RF1 is hatched in FIG. 9) (principal facial image designation means). The number of main character is not limited to one, and may be plural. In a case of determining a plurality of main characters, a plurality of principal facial images is touched by the user. Thereafter, the main character determination button 81 is touched, whereby an electronic album where the proportion of the captured images including the person of the touch principal facial image RF1 is large is generated. The main character correction button 82 is touched in a case of correcting the touched principal facial image. As shown in FIG. 9, after the principal facial image RF1 is touched, in a case of determining the person of one of other principal facial images RF2, RF3, and RF4 as a main character, the main character correction button 82 is touched by the user after the principal facial image RF1 is touched is touched. Then, the principal facial image RF1 which has been determined as a main character is cleared.

The main character integration button 83 is used in a case where a principal facial image representing an identical person is included in the principal facial images RF1, RF2, RF4, and RF5 displayed on the display screen 50. For example, if it is assumed that the principal facial images RF1 and RF2 represent an identical person, the principal facial images RF1 and RF2 are touched by the user, and thereafter, the main character integration button 83 is touched by the user. Then, as described referring to FIGS. 6 and 7, the configuration of the principal facial image list displayed on the display screen 50 in which the captured images including the person of the principal facial image RF1 and the captured images including the person of the principal facial image RF2 are assembled is reconstructed to a principal facial image list in which the captured images including the person of the principal facial image RF1 and the captured images including the person of the principal facial image RF2 are assembled.

The album image determination button 84 is touched by the user in a case of using the captured images displayed in the captured image display area 60 and the like on the right side of the principal facial image RF1 and the like as an image for album. The captured images displayed in the captured image display area 60 and the like are touched by the user, and thereafter, if the album image determination button 84 is touched, the captured images touched by the user are used in the electronic album. If the main character is determined, since the electronic album is automatically created such that the captured images including the main character is increased, the user does not necessarily select the captured images; however, the captured images can be allowed to be selected by the user, whereby the user can designate the captured images to be put in the electronic album. As shown in FIG. 9, the captured images P2, P6, P33, P53, and the like are touched (the touched state is hatched), and thereafter, if the album image determination button 84 is touched by the user, the touched captured images P2, P6, P33, P53, and the like are included in the electronic album.

The album image correction button 85 is used in a case of correcting the captured images touched by the user to be included in the electronic album as described above. The touched captured image are touched again, and thereafter, the album image correction button 85 is touched by the user, the designation of the captured images designated to be included in the electronic album is cancelled.

The album creation button 86 is touched by the user in a case of automatically creating an electronic album where the person of the designated principal facial image is a main character. For example, if the album creation button 86 is touched in a state where the principal facial image RF1 is touched, the captured images are selected such that the proportion of the captured images including the person of the principal facial image RF1 becomes a majority (preferably, equal to or greater than 70%), and the electronic album is generated.

As described above, if a main character is determined from among the principal facial images (Step 34 of FIG. 4), the main character is stored in the memory 10. If desired captured images are determined by the user from among the captured images displayed in the captured image display area 60 and the like (in Step 36 of FIG. 4, YES), the determined captured images are stored in the memory 10 as the captured images to be put in the electronic album (Step 37 of FIG. 4). If the album creation button 86 is depressed, and if an album creation command is given to the electronic album generation device 1 (in Step 38 of FIG. 4, YES), the electronic album is automatically created such that the proportion of the captured images of the main character determined in the above-described manner becomes large (Step 39 of FIG. 4).

Figure 11:
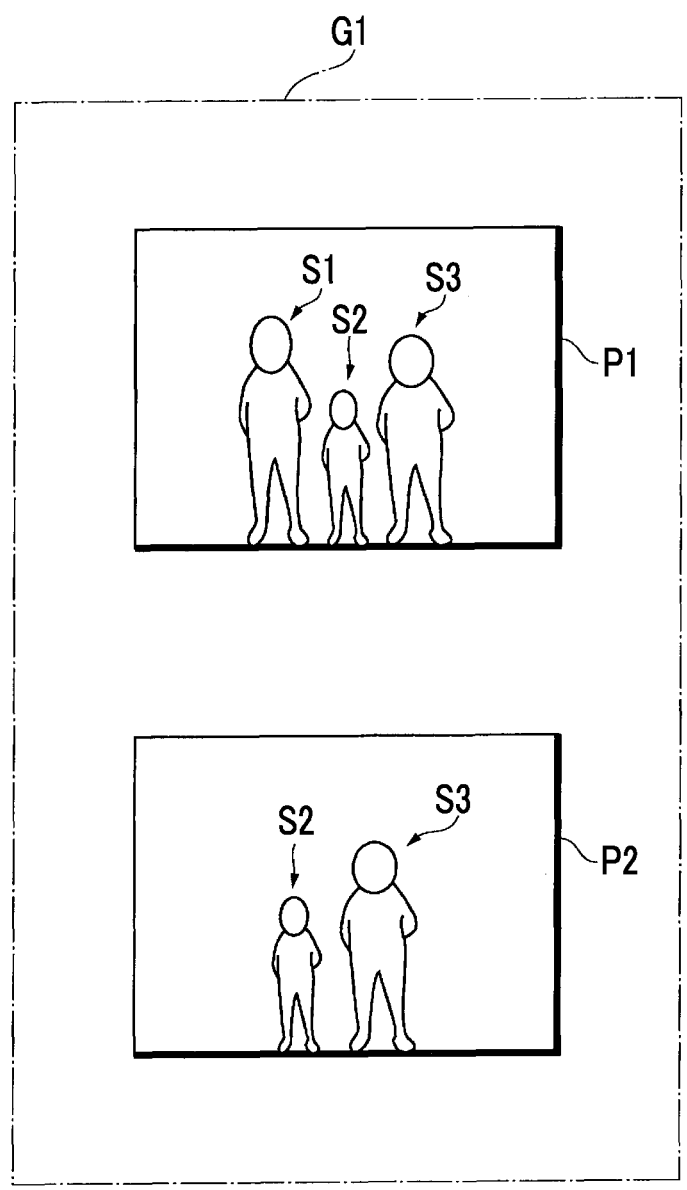
FIG. 11 is an example of a captured image.
Figure 12:
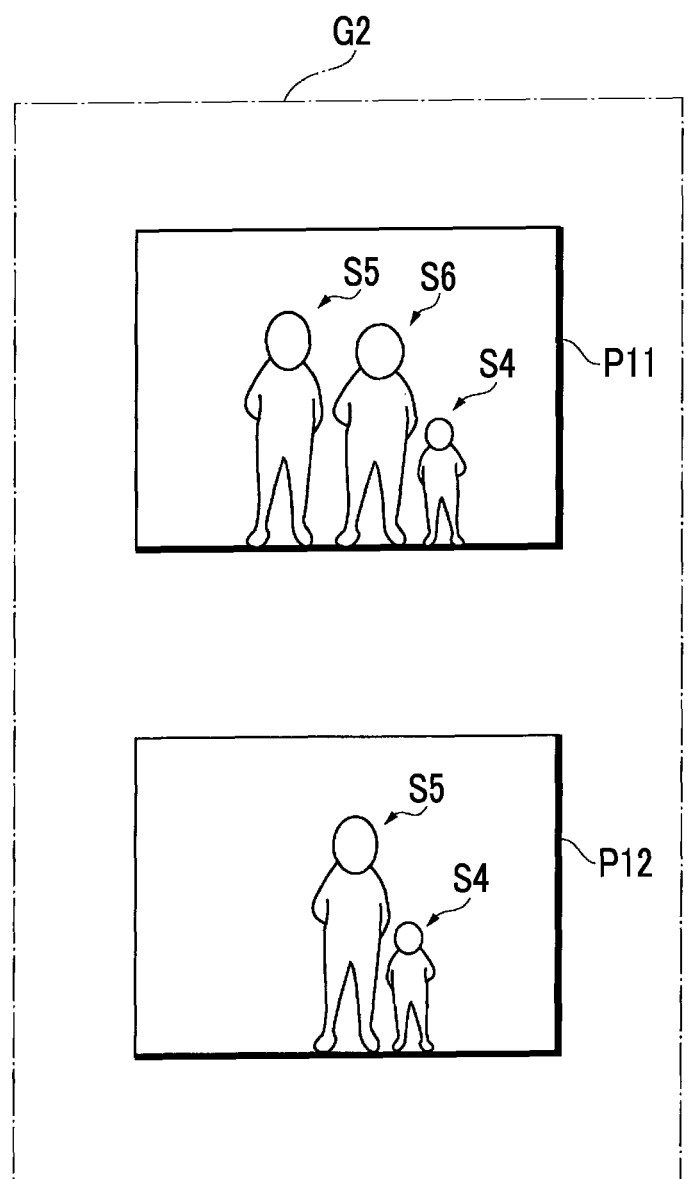
FIG. 12 is an example of a captured image.

FIGS. 10 to 12 show a modification example.

FIG. 10 is a flowchart showing a processing procedure (a processing procedure in Step 28 of FIG. 3) for finding principal facial images representing an identical person.

In a case where a principal facial image is a child (not necessarily limited to a child), even if there are principal facial images representing an identical person among a plurality of principal facial images determined for each facial image group, it may not be known whether or not the principal facial images represent an identical person. In this case, in a case where persons who are taken along with the persons of the principal facial images are an identical person, the persons of the principal facial images are considered to be an identical person.

First, it is assessed by the CPU 2 whether one principal facial image and another principal facial image are an identical person or a non-identical person (Step 91). If it is clearly assessed to be an identical person, the persons represented by these principal facial images are determined to be an identical person (Step 97). If it is clearly assessed to be not an identical person (non-identical person), the persons represented by these principal facial images are determined to be not an identical person (Step 99) (second principal facial image assessment means). In a case where it cannot be assessed (unassessable) whether or not one principal facial image and another principal facial image are an identical person, the next process is performed.

First, a captured image having a person taken along with one principal facial image is found from the same captured image group by the CPU 2 (Step 92). For example, as shown in FIG. 11, in a captured image P1 included in a captured image group G1, it is assumed that a person S2 is a person of a principal facial image. Since the captured image P1 has a person S1 and a person S3 taken along with the person S2, the captured image P1 is found. Similarly, since a captured image P2 has the person S3 taken along with the person S2 of the principal facial image, the captured image P2 is found.

Subsequently, a captured image having a person taken along with another principal facial image is found from the same captured image group (Step 93). As shown in FIG. 12, in a captured image P11 included in a captured image group G2, it is assumed that a person S4 is a person of a principal facial image. Since the captured image P11 has a person S5 and a person S6 taken along with the person S4, the captured image P11 is found. Similarly, since a captured image P12 has the person S5 taken along with the person S4 of the principal facial image, the captured image P12 is found.

Subsequently, it is assessed whether or not the facial image of the person taken along with the person of one principal facial image and the facial image of the person taken along with the person of another principal facial image are an identical person (Step 94) (auxiliary facial image assessment means). For example, if it is assessed that the facial image of at least one of the persons S1 and S3 included in the captured image P1 shown in FIG. 11 and the facial image of at least one of the persons S4 and S5 included in the captured image P11 (or another captured image P12) shown in FIG. 12 are an identical person, it is assessed in Step 94 to be an identical person (in Step 94, YES). Then, the number of times that it is assessed to be an identical person is incremented (Step 95).

If the number of times that it is assessed to be an identical person is not a predetermined number of times determined in advance (in Step 96, NO), it is confirmed whether or not there is no captured image having a person taken along with the person of one principal facial image or the person of another principal facial image in the captured image group (Step 98). If there is no captured image, it is determined that the person of one principal facial image and the person of another principal facial image are not an identical person (Step 99). If there is a captured image having a person taken along with the person of one principal facial image or the person of another principal facial image in the captured image group (in Step 98, NO), the process from Step 94 is repeated again. For example, it is assessed whether or not the person S3 taken along with the person S2 of the principal facial image in the captured image P2 shown in FIG. 11 and the person S5 taken along with the person S4 of the principal facial image in the captured image P12 shown in FIG. 12 are an identical person (Step 94). If it is assessed to be an identical person, the number of times that it is assessed to be an identical person is incremented (Step 95).

If the number of times that it is assessed to be an identical person is equal to or greater than the predetermined number of times (Step 96), it is determined that the person of one principal facial image and the person of another principal facial image are an identical person (Step 97). However, when the number of times that it is assessed to be an identical person is only once, not the predetermined number of times, it may be assessed that the person of one principal facial image and the person of another principal facial image are an identical person.

In the above-described example, as shown in FIG. 8 and the like, although the principal facial image RF1 and the like are displayed on the display screen 50, and the main character of the electronic album is selected from the displayed principal facial image RF1 and the like by the user, the main character of the electronic album may be automatically determined from the principal facial image RF1 and the like without displaying the principal facial image RF1 and the like. In this case, for example, a case where a person taken in the largest number of captured images from among the persons of the principal facial images is determined is considered; however, the main character may be determined using other methods.

As shown in FIG. 5, although the multiple captured images are divided into the captured image groups based on the imaging timing, a command for adjusting the term during which the imaging timing is different to be considered as different events may be given from an input device 9 of the electronic album generation device 1. A mass of captured images separated for the term or more given from the input device 9 becomes one captured image group. Since a child grows up fast, the principal facial images determined from the captured image group are an identical child, but may be assessed as different persons, the captured images whose imaging timing is not different are included in one captured image group. For this reason, in a case of determining a child as a main character, the term is adjusted by the input device 9 such that the interval of the captured image group is reduced.

What is claimed is:

1. A device for determining a principal facial image in a captured image, the device comprising:
   one or more processors;
   a facial image grouping device for grouping multiple facial images obtained from multiple captured images by event to generate a plurality of facial image groups;
   a principal facial image determination device for determining one or a plurality of principal facial images of facial images included in each of the plurality of facial image groups generated by the facial image grouping device as a facial image of a principal person of the multiple captured images for each facial image group; and
   a facial image group mixing device for assembling facial image groups, in which the number of facial images included in each of the plurality of facial image groups generated by the facial image grouping device is less than a given number, in one facial image group,
   wherein the principal facial image determination device determines the facial image group assembled in said facial image group mixing device and a principal facial image of facial images included in each of the plurality of facial image groups generated by said facial image grouping device as a facial image of a principal person of the multiple captured images for each facial image group.

2. The device according to claim 1,
   wherein said facial image group mixing device assembles facial image groups, in which the number of facial images included in each of the plurality of facial image groups generated by said facial image grouping device is less than the given number, in one facial image group such that a given number or more of facial images are included.

3. The device according to claim 1, further comprising:
   a first principal facial image assessment device for assessing whether or not one principal facial image and another principal facial image among the principal facial images determined for each facial image group by said principal facial image determination device represent an identical person.

4. The device according to claim 1, further comprising:
   a second principal facial image assessment device for assessing whether one principal facial image and another principal facial image among the principal facial images determined for each facial image group by said principal facial image determination device represent an identical person or a non-identical person; and
   an auxiliary facial image assessment device for, in a case where said second principal facial image assessment device is unable to assess whether one principal facial image and another principal facial image represent an identical person or a non-identical person, assessing whether or not a facial image included in a captured image with one principal facial image and a facial image included in a captured image with another principal facial image are an identical person,
   wherein said second principal facial image assessment device assesses that one principal facial image and another principal facial image represent an identical person when said auxiliary facial image assessment device assesses that the facial image included in the captured image with one principal facial image and the facial image included in the captured image with another principal facial image are an identical person.

5. The device according to claim 4,
   wherein said second principal facial image assessment device assesses that one principal facial image and another principal facial image represent an identical person when the number of times that said auxiliary facial image assessment device assesses that the facial image included in the captured image with one principal facial image and the facial image included in the captured image with another principal facial image are an identical person is equal to or greater than a predetermined number.

6. The device according to claim 1,
   wherein said facial image grouping device includes a captured image grouping device for grouping the multiple captured images by event, and
   facial images are detected from the multiple captured images grouped by event by said captured image grouping device to generate a plurality of facial image groups by event.

7. The device according to claim 6,
   wherein it is defined that captured images whose imaging timing is close are obtained in the same event and captured images whose imaging timing is different are obtained in different events, and multiple captured images are grouped by event.

8. The device according to claim 7, further comprising:
   a term adjustment device for adjusting a term during which the imaging timing is different to be considered as different events.

9. The device according to claim 1,
   wherein said facial image grouping device further includes a facial image detection device for detecting a facial image from each of the multiple captured images, and
   the multiple facial images detected by said facial image detection device are grouped by event to generate a plurality of facial image groups.

10. The device according to claim 1, further comprising:
an electronic album generation device for generating an electronic album where captured images including at least one principal person among principal persons specified by the principal facial images determined by said principal facial image determination device are more than other captured images.

11. The device according to claim 10, further comprising:
a display control device for performing control such that a display device displays the principal facial images determined by said principal facial image determination device on a display screen; and
a principal facial image designation device for designating at least one principal facial image among the principal facial images displayed on the display screen of the display device under the control of said display control device,
wherein said electronic album generation device generates the electronic album using the multiple captured images such that captured images including the principal person specified by one principal facial image designated by said principal facial image designation device are more than captured images not including the principal person.

12. The device according to claim 11,
wherein said display control device performs control such that the display device displays one principal facial image on the display screen for the principal facial images determined as representing an identical person by said second principal facial image assessment device among the principal facial image determined by said principal facial image determination device.

13. A control method for a device for determining a principal facial image in a captured image, the device comprising one or more processors, the control method comprising:
causing a facial image grouping device to group multiple facial images obtained from multiple captured images by event to generate a plurality of facial image groups;
causing a principal facial image determination device to determine one or a plurality of principal facial images of facial images included in each of the plurality of facial image groups generated by the facial image grouping device as a facial image of a principal person of the multiple captured images for each facial image group;
causing a facial image group mixing device to assemble facial image groups, in which the number of facial images included in each of the plurality of facial image groups generated by the facial image grouping device is less than a given number, in one facial image group; and
causing the principal facial image determination device to determine the facial image group assembled in said facial image group mixing device and a principal facial image of facial images included in each of the plurality of facial image groups generated by said facial image grouping device as a facial image of a principal person of the multiple captured images for each facial image group.

14. A non-transitory recording medium storing a computer-readable program which controls a computer of a device for determining a principal facial image in a captured image, the device comprising one or more processors, to execute:

grouping multiple facial images obtained from multiple captured images by event to generate a plurality of facial image groups;
determining one or a plurality of principal facial images of facial images included in each of the plurality of generated facial image groups as a facial image of a principal person of the multiple captured images for each facial image group;
assembling facial image groups, in which the number of facial images included in each of the plurality of facial image groups is less than a given number, in one facial image group; and
determining the facial image group and a principal facial image of facial images included in each of the plurality of facial image groups as a facial image of a principal person of the multiple captured images for each facial image group.

15. A device for determining a principal facial image in a captured image, the device comprising:
one or more processors;
a facial image grouping device for grouping multiple facial images obtained from multiple captured images to generate a plurality of facial image groups;
a principal facial image determination device for determining one or a plurality of principal facial images of facial images included in the plurality of facial image groups as a facial image of a principal person of the multiple captured images for each facial image group;
a display control device for performing control such that a display device displays the principal facial images determined by said principal facial image determination device on a display screen;
a principal facial image designation device for designating at least one principal facial image among the principal facial images displayed on the display screen of the display device under the control of said display control device; and
an electronic album generation device for generating an electronic album using the multiple captured images such that captured images including the principal person specified by one principal facial image designated by said principal facial image designation device are more than captured images not including the principal person.

16. A control method for a device for determining a principal facial image in a captured image, the device comprising one or more processors, the control method comprising:
causing a facial image grouping device to group multiple facial images obtained from multiple captured images to generate a plurality of facial image groups;
causing a principal facial image determination device to determine one or a plurality of principal facial images of facial images included in the plurality of facial image groups as a facial image of a principal person of the multiple captured images for each facial image group;
causing a display control device to perform control such that a display device displays the principal facial images determined by said principal facial image determination device on a display screen;
causing a principal facial image designation device to designate at least one principal facial image among the principal facial images displayed on the display screen of the display device under the control of said display control device; and causing an electronic album generation device to generate an electronic album using the multiple captured images such that captured images including the principal person specified by one principal facial image designated by said principal facial image designation device are more than captured images not including the principal person.

17. A non-transitory recording medium storing a computer-readable program which controls a computer of a device for determining a principal facial image in a captured image, the device comprising one or more processors, to execute:

grouping multiple facial images obtained from multiple captured images to generate a plurality of facial image groups;

determining one or a plurality of principal facial images of facial images included in the plurality of facial image groups as a facial image of a principal person of the multiple captured images for each facial image group;

performing control such that a display device displays the principal facial images on a display screen;

designating at least one principal facial image among the principal facial images displayed on the display screen of the display device; and generating an electronic album using the multiple captured images such that captured images including the principal person specified by one principal facial image designated by said principal facial image designation device are more than captured images not including the principal person.

* * * * *